No. 633,449. Patented Sept. 19, 1899.
F. J. HAESELER.
ROTARY ENGINE.
(Application filed May 26, 1899.)

(No Model.) 4 Sheets—Sheet 1.

Witnesses
John H. Holt
J. Stephen Hinsto

Inventor
F. J. Haeseler
by Wilkinson & Fisher.
Attorneys

THE NORRIS PETERS CO., PHOTO-LITHO., WASHINGTON, D. C.

No. 633,449. Patented Sept. 19, 1899.
F. J. HAESELER.
ROTARY ENGINE.
(Application filed May 26, 1899.)
(No Model.) 4 Sheets—Sheet 2.

Witnesses
John N. ...
J. Stephen ...

Inventor
F. J. Haeseler.
by Wilkinson & Fisher
Attorneys

THE NORRIS PETERS CO., PHOTO-LITHO., WASHINGTON, D. C.

No. 633,449. Patented Sept. 19, 1899.
F. J. HAESELER.
ROTARY ENGINE.
Application filed May 26, 1899.
(No Model.) 4 Sheets—Sheet 3.

Witnesses
John N. Holt
J. Stephen Ninsla

Inventor
F. J. Haeseler
by Wilkinson & Fisher
Attorneys

No. 633,449. Patented Sept. 19, 1899.
F. J. HAESELER.
ROTARY ENGINE.
(Application filed May 26, 1899.)
(No Model.) 4 Sheets—Sheet 4.

Witnesses
John N. Helb
J. Stephen Hinsla

Inventor
F. J. Haeseler.
by Wilkinson & Fisher.
Attorneys

UNITED STATES PATENT OFFICE.

FRANCIS J. HAESELER, OF WASHINGTON, DISTRICT OF COLUMBIA.

ROTARY ENGINE.

SPECIFICATION forming part of Letters Patent No. 633,449, dated September 19, 1899.

Application filed May 26, 1899. Serial No. 718,404. (No model.)

*To all whom it may concern:*

Be it known that I, FRANCIS J. HAESELER, a citizen of the United States, residing at Washington, in the District of Columbia, have invented certain new and useful Improvements in Rotary Engines; and I do hereby declare the following to be a full, clear, and exact description of the invention, such as will enable others skilled in the art to which it appertains to make and use the same.

My invention relates to improvements in rotary engines, and more particularly to that class of rotary engines in which a plurality of cylinders are caused to rotate around a common pivot.

According to my invention the cylinders of the engine are caused to rotate around a fixed stem or stud common to all, through which the driving fluid is admitted to and exhausted from the cylinders.

My invention furthermore embodies an improved form of valve and valve-seat and other novel features of construction, all of which will be hereinafter fully described and claimed, and while I have chosen to show and describe the rotary engine as applied to a drill or reamer it is not confined to such use alone, being readily adapted by virtue of its great compactness and strength for use upon automobiles and, indeed, to various other uses, as will hereinafter more readily appear.

In order that my invention may be more clearly understood, the same will be described with reference to the accompanying drawings, in which—

Figure 1:
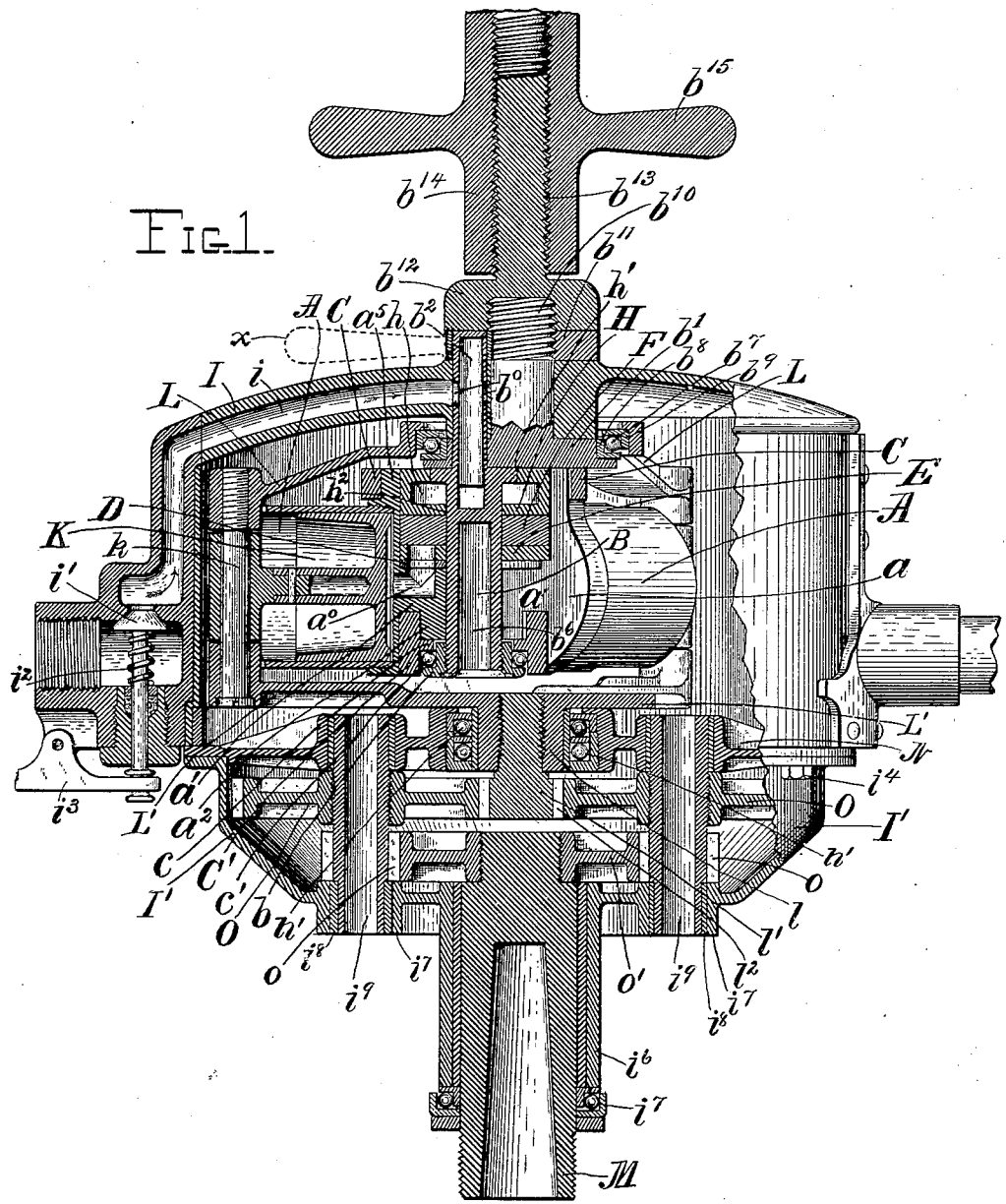
Figure 2:
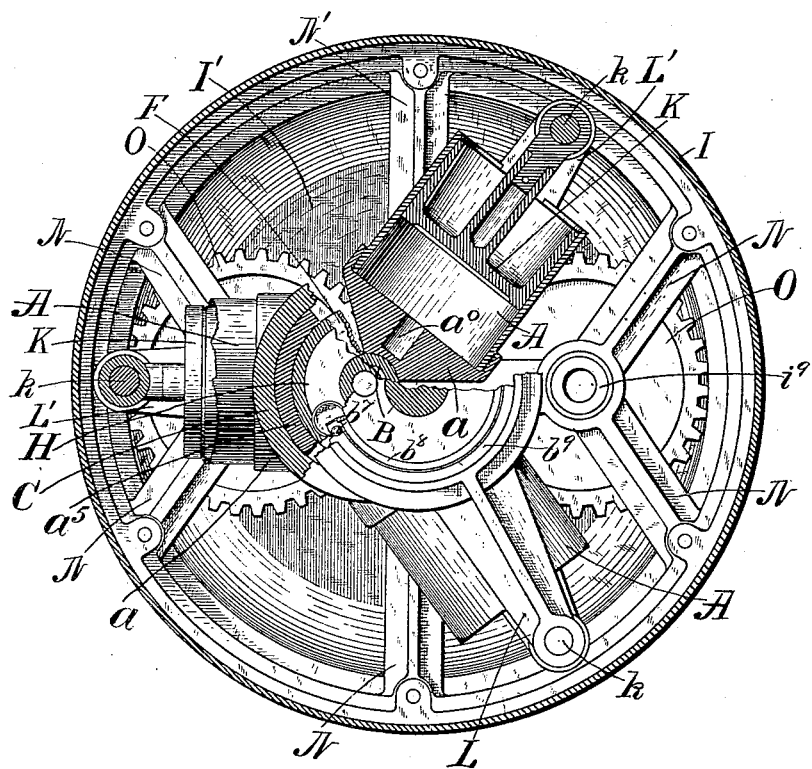
Figure 3:
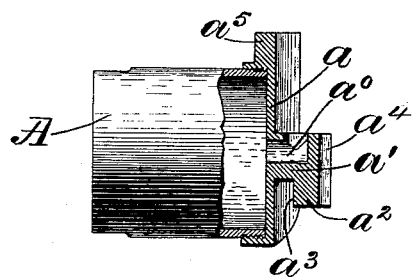
Figure 4:
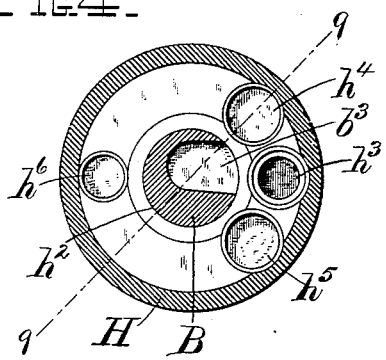
Figure 7:
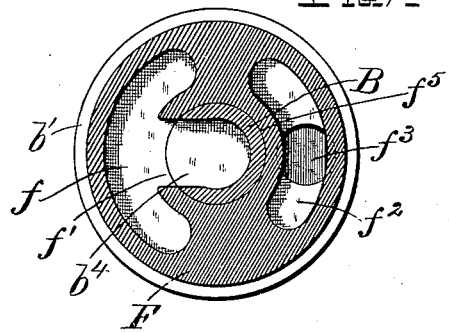
Figure 5:
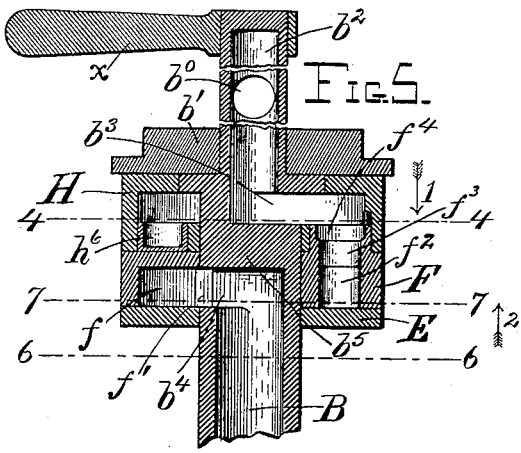
Figure 8:
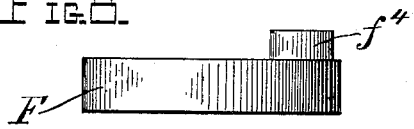
Figure 9:
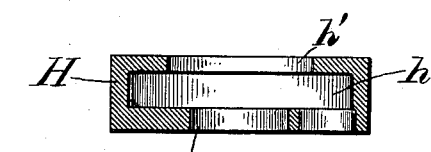
Figure 6:
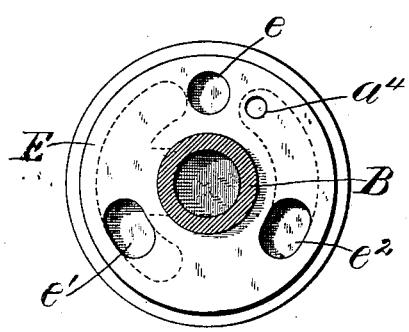
Figure 10:
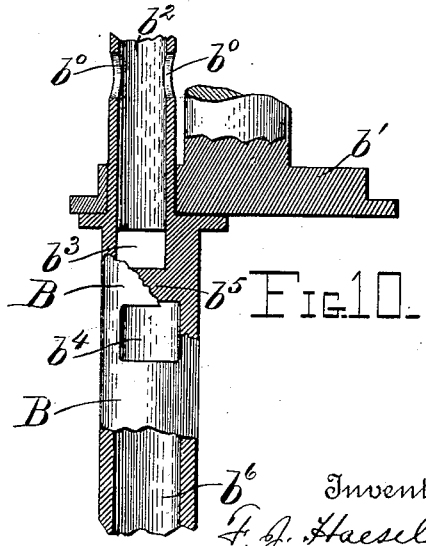
Figure 11:
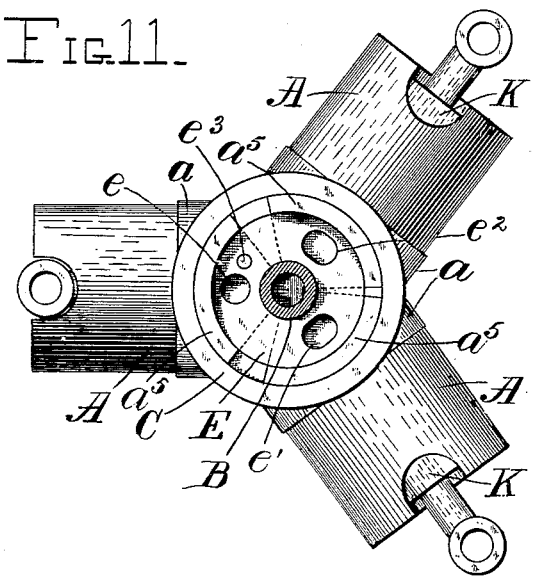
Figure 12:
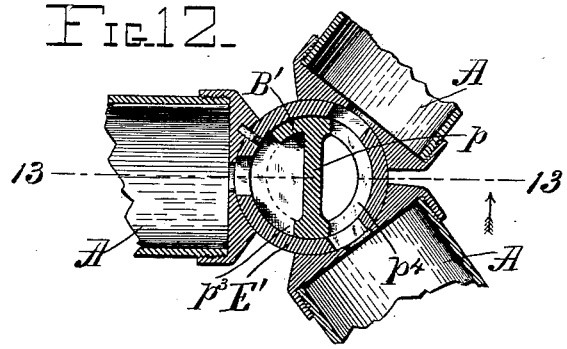
Figure 13:
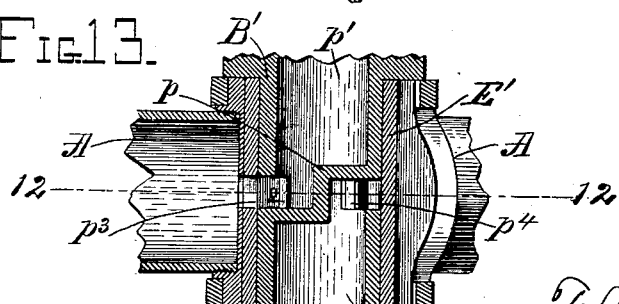

Figure 1 represents a central vertical section, partly in elevation, of my improved rotary engine as employed with a drill or reamer. Fig. 2 is a fragmentary horizontal sectional view of the device shown in Fig. 1. Fig. 3 represents one of the cylinders in side elevation and partly in section. Fig. 4 is an enlarged detail sectional view taken along the line 4 4, Fig. 5, looking in the direction of the arrow 1. Fig. 5 is an enlarged detail central section of the stud or crank-arm, valve-cover, valve, and valve-seat, the section being taken at ninety degrees from that shown in Fig. 1. Fig. 6 represents a section taken along the line 6 6, Fig. 5, looking in the direction of the arrow 2. Fig. 7 represents a section taken along the line 7 7, Fig. 5, and looking in the direction of the arrow 2. Fig. 8 represents the valve in side elevation. Fig. 9 represents a central section of the valve-cover, taken along the line 9 9, Fig. 4. Fig. 10 represents an enlarged fragmentary section, partly in elevation, of the crank arm or stud around which the cylinders are mounted and through which the driving fluid passes. Fig. 11 is a top plan view of the cylinders and retaining-ring with the valve removed to show the valve-seat and mode of connecting it to one of the cylinders. Fig. 12 is a fragmentary sectional view of another form of valve and valve-seat embodying my invention and taken along the line 12 12, Fig. 13. Fig. 13 is a central vertical section of the same, taken along the line 13 13, Fig. 12, and looking in the direction of the arrow.

The engine consists, among other parts, of a plurality of cylinders A, (in this case three in number, though not necessarily confined to that number,) independently mounted and adapted to rotate around a common stud or stem B, through which the motive fluid is admitted into and exhausted from the cylinders. These cylinders are open at one end and closed at the other by a cylinder-head $a$, of peculiar construction, into which the barrel of the cylinder is screwed, as shown. These cylinder-heads each have a lug $a'$ extending therefrom, which is in turn provided with a downwardly-extending lug or lip $a^2$, the latter having its faces $a^3$ and $a^4$ curved to conform to the curvature of the retaining-ring and eccentric stud, respectively, hereinafter described. At the top of the cylinder-head is another lug $a^5$, which is also curved or made in the shape of a segment of a ring, so that its curvature will conform to that of the retaining-ring by which it is held.

The portions of the cylinder-heads next to the central stud B conform to the curvature of the stud, and they are held securely against it by two retaining-rings C and C'. The retaining-ring C passes around the outside of the lugs $a^5$, and the ring C' passes between the lower lugs or lips $a^2$ and the cylinder-heads, as shown most clearly in Fig. 1. By this means the portions $a$ of the cylinders are held securely against the central stud, the cylinders being thus supported both above and below.

The lower retaining-ring C' is provided with a flange $c$, which, together with a cap $b$, screwed on the lower end of the stud B, and balls $c'$, forms one of the ball-bearings upon which the cylinders rotate.

Each cylinder is provided with a port $a^0$, which passes through the cylinder-head, as shown.

The upper faces of the lugs $a$ are accurately ground to receive the valve-seat plates D, which are secured to each of the said lugs. Upon these plates D rests the valve-seat E. (Shown most clearly in Figs. 1, 5, and 6.) This valve-seat E is a plate or disk, preferably of brass or some other suitable antifriction metal, and is provided with three apertures or ports $e$, $e'$, and $e^2$ and is secured to one of the cylinder-heads by a pin $e^3$, which passes through the valve-seat plate D and into the lug $a$ of the cylinder-head, thus securing the said valve-seat to one of the cylinders and causing it to rotate therewith, as hereinafter more fully described.

The openings or ports $e$, $e'$, and $e^2$ register with three similar openings in the valve-seat plates D, the opening $e$ being preferably circular, while the openings $e'$ and $e^2$ are somewhat elongated. The valve-seat is provided with a central opening, through which the stud B passes, and with an opening $a^4$ for the reception of the pin $e^3$. Upon this valve-seat E rests the valve F. (Shown most clearly in Figs. 1, 5, 7, and 8.) This valve is provided with the exhaust-chamber $f$, port $f'$, and admission-chamber $f^2$, and the admission-chamber is provided with an opening $f^3$, which extends upward, forming a hollow nipple $f^4$. The lower face of the valve F is accurately ground to fit squarely upon the valve-seat E.

The valve F is provided with a central opening $f^5$, through which the stem or stud B passes, fitting the opening snugly.

Resting upon the valve F is the valve-cover H, having the chamber $h$ and provided with the enlarged central opening $h'$ through its top and with the smaller opening $h^2$ through its bottom for the reception of the stud B. This valve-cover H is provided with a passage $h^3$, into which the hollow stem $f^4$ fits snugly, and thus provides a communication to the passage $f^3$ in the valve F. Three cups $h^4$, $h^5$, and $h^6$ are placed on the top of the valve F, the cups $h^4$ and $h^5$ being situated on either side of the passage $h^3$, while the cup $h^6$ is situated opposite to said passage. The combined area of the cups $h^4$ and $h^5$ is something greater than the area of the admission-chamber $f^2$, and the area of the cup $h^6$ is equal to the difference between the area of the passage $h^3$ and the sum of the areas of the cups $h^4$ and $h^5$. Evidently the tendency of an apparatus constructed without these cups is to lift the valve off its seat. This tendency is completely overcome, owing to the position of said cups and the relation of their areas as compared with the area of the chamber $f^2$.

That part of the stem or stud B which is situated eccentrically in relation to the machine is hollow, being provided with the passage $b^2$ for the admission of the air, which passage connects, by means of one of the openings $b^0$, with the passage $i$ in the casing I of the machine. This passage $i$ is governed by a valve $i'$, provided with a spring $i^2$, which normally keeps said valve closed, and which valve is opened by a lever $i^3$ when it is desired to operate the engine. The stem B is provided with the port $b^3$, from which air is delivered into the chamber $h$, from whence it passes through the openings $f^3$ and $a^0$ into one of the cylinders A. Below the port $b^3$ is a partition $b^5$. Below this partition is an opening or passage $b^6$, running through the stem, and a port $b^4$, through which the air is exhausted from the cylinders through the passage $b^6$ into the center of the machine, from whence it escapes, as will be hereinafter described. Of course the air might be exhausted directly into the central part of the machine, if desired.

The stem or stud $B^2$ is provided with a broad flanged head $b'$, upon which is mounted a ring $b^8$, between which and a similar ring $b^9$ the balls $b^7$ are mounted, forming a bearing for the upper part of the stem, as shown in Fig. 1. The eccentric portion of the stem is rotatably mounted in the head $b'$ and extends through the casing I. A handle $x$ is fastened to the upper part of the hollow stem B, which handle, if rotated ninety degrees, cuts off the supply of air or other motive fluid, thereby stopping the engine, and if rotated ninety degrees more reverses the engine, as the valve F is fixed to the stem B. The upper central stud or stem $B^2$ passes through the casing I of the machine and is screw-threaded at $b^{10}$ and provided with a nut $b^{11}$ and a feed-nut $b^{12}$, the other part of which is screw-threaded at $b^{13}$, engaging with a nut $b^{14}$, provided with handles $b^{15}$, by means of which the machine is fed up to its work.

Located within the cylinders are the pistons K, upon which the cylinders are free to slide, the pistons themselves being secured from longitudinal motion by having their stems attached to pivots $k$. Said pistons are therefore free to swing, but not to move longitudinally in the cylinders, and the said pistons are secured in a revolving frame which runs upon the ball-bearings formed around the balls $n'$ and $b^7$. This frame consists of three upper members L, running from the upper ball-bearing on the stem B to the pivot $k$, and of three similarly-disposed lower members L'. These lower members unite to form a projection $l$, which is perforated and screw-threaded on its interior. Into this perforation is screwed a stud $l'$, provided with a gear-wheel $l^2$. The lower part of the casing I is provided with a removable head I', attached thereto by bolts $i^4$. The lower part of the head I' is provided with a central projecting stud $i^6$, in which the tool-carrier M is mounted. At the end of the stud $i^6$ a ball-bearing $i^7$ of the usual construction is formed. The head I' is provided with two smaller studs $i^7$ $i^7$, each of which is provided with a bushing $i^8$, and through these studs project the hollow exhaust tubes or shafts $i^9$, which are rotatable and transmit, by suitable gearing, motion from the stud $l'$ to the tool-holder M. At their lower ends these hollow shafts are supported in bearings in the studs $i^7$. Their upper ends are secured in bearings in the frames N. (Best shown in Figs. 1 and 2.) As shown, these frames N each have three arms, two reaching from the circumference of the head I' to the hollow shafts $i^9$ and the third reaching to ball-bearings $n$ $n'$, preferably one immediately over the other, surrounding the projection $l$. Cross-frames N' are used to give additional strength.

As said before, the stud $l'$ is provided with a gear-wheel $l^2$, which gear-wheel meshes with the gear-wheels O, one of which is located on each shaft $i^9$. Each of these hollow shafts is also provided with a gear-wheel $o$, all of which mesh with the gear-wheel $o'$ on the tool-holder M. The casing I is of course provided with suitable handles, one of which is made hollow for the admission of the motive fluid, preferably compressed air.

The operation is as follows: Steam or compressed air being admitted through the passage $i$ passes through the opening $b^2$ in the stem B, out through the port $b^3$ into the chamber $h$, and through the valve F and passage $a^0$ into one of the cylinders A. The piston K in said cylinder being unable to move longitudinally, the pressure of the air or other motive fluid tends to slide the cylinder A toward the stem B. As the cylinder A cannot move toward the stem B, the pressure of the air causes the pistons and supporting-frames to revolve on the ball-bearings around said stem, carrying the cylinders with them and causing the cylinders to revolve around the eccentric stud, the retaining-rings C and C' holding the parts in their proper relative positions. As the valve F is fixed to the stem B, the rotation of the cylinders around said stem soon causes the air to be cut off from the first cylinder at any desired point of the stroke of its piston and admitted to the second cylinder. As the cylinder which is charged proceeds with its movement the passage $a^0$ finally comes into connection with the port $b^4$ in the stem B, and the air is therefore exhausted into the center of the machine, from whence it escapes through the hollow shafts $i^9$. The supply of air to said cylinders and the exhausting of the air therefrom is kept up automatically until the supply of air is cut off.

My machine is simple, cheap, easy to make, and very efficient. One of the special features of improvement is the use of the valve-seat E, made of brass or antifriction metal, which practically receives (exclusive of the ball-bearings) the entire wear of the inner part of the machine. As this can be readily renewed, it does away with all adjustments, which are troublesome to make and often involve great expense, especially if, as often happens, certain parts of the machine have to be renewed.

In Figs. 12 and 13 I have shown in modified form means for admitting air to the cylinders and exhausting it therefrom. In this modification the valve-seat E' is vertically arranged instead of horizontally, as in Fig. 1. The fixed stem B' is provided with a central stepped projection $p$, with a supply-passage $p'$ and an exhaust-passage $p^2$. It is also provided with an admission-port $p^3$ and an exhaust-port $p^4$. The construction and operation of this form of my invention will, it is thought, be clear without further explanation, and as the pressure when the cylinder is receiving air causes the cylinder-head to be forced against the stud during the entire time that it has air under pressure inside of it any lost motion due to wear of the valve-seat E' is automatically taken up, and the cylinder-heads are always held closely against the valve-seat and that in turn against the valve on the pressure side. The effect of this is to leave any opening due to wear on the exhaust side of the eccentric stud, where the escape of the air is an advantage not only because it will reduce back pressure, but also because it will tend to lubricate the surfaces of the valve-seat.

Having thus described my invention, what I claim as new, and desire to secure by Letters Patent of the United States, is—

1. In a rotary engine, a supporting stem or stud provided at one end with a head, an eccentric stem carried by said head and provided with admission and exhaust ports for the motive fluid, a plurality of cylinders free to rotate around said eccentric stem, and pistons working in said cylinders, substantially as described.

2. In a rotary engine, a supporting stem or stud provided at one end with a head, an eccentric stem rotatably mounted in said head and provided with admission and exhaust ports for the motive fluid, a plurality of cylinders free to rotate around said eccentric stem, and pistons working in said cylinders, substantially as described.

3. In a rotary engine, a supporting stem or stud provided at one end with a head, an eccentric stem mounted in said head and provided with admission and exhaust passages for the motive fluid, a loose collar mounted on said eccentric stem, a plurality of cylinders free to rotate around said eccentric stem, and pistons working in said cylinders, substantially as described.

4. In a rotary engine, a supporting stem or stud provided at one end with a head, an eccentric tubular stem carried by said head, a partition across said tubular stem with admission and exhaust ports, one on each side of said partition, a plurality of cylinders free to rotate around said stem or stud, a supporting-frame, pistons pivotally mounted in said frame and working in said cylinders, substantially as described.

5. In a rotary engine, a supporting stem or stud provided at one end with an annular flanged head, an eccentric tubular stem carried by said head, a partition across said tubular stem with admission and exhaust ports, one on each side of said partition, a plurality of independent reciprocating cylinders free to rotate around said stem or stud, a supporting-frame, and pistons pivotally mounted in said frame and working in said cylinders, substantially as described.

6. In a rotary engine, a supporting stem or stud provided with a head and an eccentric tubular stem carried by said head and rotatably secured thereto, said stem being provided with admission and exhaust passages, a plurality of cylinders free to rotate around said stem, a supporting-frame, pistons pivotally mounted in said frame and working in said cylinders, and means for reversing said engine, substantially as described.

7. In a rotary engine, a supporting stem or stud provided with a head and an eccentric tubular stem, said stem being provided with admission and exhaust passages and a partition separating the two, a plurality of cylinders free to rotate around said stem, a supporting-frame, pistons pivotally mounted in said frame and working in said cylinders, and means for reversing said engine by varying the angular position of said tubular stem, substantially as described.

8. In a rotary engine, a supporting stem or stud secured to the engine-casing and terminating at one end in a head in the form of a disk, a tubular stem carried by said disk and eccentric thereto, said tubular stem being provided with admission and exhaust passages, cylinders rotatably mounted around said stem, and pistons working in said cylinders, substantially as described.

9. In a rotary engine, a supporting stem or stud provided at one end with an annular flanged head, an eccentric tubular stem carried by said head said stem being provided with admission and exhaust ports and a partition separating the two, a loose sleeve mounted on said stem, a plurality of independent reciprocating cylinders free to rotate around said stem, a supporting-frame, and pistons pivotally mounted in said frame and working in said cylinders, substantially as described.

10. In a rotary engine, a supporting stem or stud provided with a head and an eccentric stem carried thereby, said stem being provided with admission and exhaust passages and a partition separating the two, a loose sleeve mounted on said stem, a plurality of independent cylinders free to rotate around said stem, one of said cylinders being secured to said sleeve, a supporting-frame and pistons pivotally mounted in said frame, substantially as described.

11. In a rotary engine, the combination with a supporting stem or stud terminating at one end in a head, an eccentric stem carried by said head and provided with admission and exhaust ports for the motive fluid, a plurality of cylinders rotating around said eccentric stem as a center, and pistons working in said cylinders and rotating around said stud and head as a center, substantially as described.

12. In a rotary engine, the combination with a supporting stem or stud secured fast to the frame of the engine and provided at one end with a head, a hollow eccentric stem carried by said head, the said eccentric stem being free at one end and provided with admission and exhaust passages for the motive fluid, a valve-seat in the form of a sleeve surrounding said eccentric stem, a plurality of cylinders rotatably mounted around said eccentric stem, one of said cylinders being secured to said valve-seat, pistons working in said cylinders and rotating around the supporting-stud and head as a center, substantially as described.

13. In a rotary engine, the combination with the casing, of a supporting stem or stud secured to the said casing and having a head and an eccentric stem carried by said head, a loose sleeve carried by said eccentric stem, a plurality of independent cylinders rotating around said eccentric stem, one of said cylinders being secured to said sleeve, one or more independent rings holding said cylinders against said eccentric stem, and each ring being common to all of said cylinders, substantially as described.

14. In a rotary engine, the combination with the casing, of a supporting stem or stud secured to said casing and having a head and an eccentric stem carried by said head, a plurality of independent cylinders rotating around said eccentric stem, and one or more independent rings holding said cylinders against said eccentric stem, each ring being common to all of said cylinders, substantially as described.

15. In a rotary engine, a supporting stem or stud provided with a head and an eccentric tubular stem carried by said head, said stem having admission and exhaust passages with a partition separating the two, a concentric valve-seat mounted on said stem, a plurality of cylinders free to rotate around said tubular stem, a supporting-frame and pistons pivotally mounted in said frame and working in said cylinders, substantially as described.

16. In a rotary engine, a supporting stem or stud provided with a head and an eccentric tubular stem carried by said head, said stem having admission and exhaust passages, with a plurality of cylinders free to rotate around said tubular stem and together with said sleeve, a concentric valve-seat mounted on said tubular stem and common to all of said cylinders, a supporting-frame, and pistons pivotally mounted in said frame, and working in said cylinders, substantially as described.

17. In a rotary engine, a supporting stem or stud provided with a head and an eccentric tubular stem carried by said head, said stem having admission and exhaust passages with a partition separating the two, a plurality of cylinders free to rotate around said tubular stem, a concentric valve-seat loosely mounted on said tubular stem common to all of said cylinders and secured to one of the same, a supporting-frame, and pistons pivotally mounted in said frame and working in said cylinders, substantially as described.

18. In a rotary engine, a supporting stem or stud provided with a head and an eccentric tubular stem rotatably mounted in said head, said stem having admission and exhaust passages with a partition separating the two, a plurality of cylinders free to rotate around said tubular stem, a concentric valve-seat common to all of said cylinders and secured to one of the same, a supporting-frame, pistons pivotally mounted in said frame, and working in said cylinders, substantially as described.

19. In a rotary engine, a supporting stem or stud provided with a head and a projecting portion eccentrically located with regard to said head, said portion being tubular and provided with a stepped partition, inlet and exhaust ports, one on each side of said partition, a plurality of cylinders rotating around said tubular stem and a plurality of pivoted pistons working in said cylinders, substantially as described.

20. In a rotary engine, a supporting stem or stud provided with a head and a tubular projecting portion eccentrically located with regard to said tubular head, said portion being provided with admission and exhaust passages, a plurality of cylinders mounted to rotate around said tubular stem each cylinder being open at one end and provided at the other end with a tapered head, said head being curved to receive the said tubular stem and provided with retaining-lugs, and pistons working in said cylinders, substantially as described.

21. In a rotary engine, the combination of a casing provided with an inlet-passage, a supporting stem or stud provided with a head and a projecting portion eccentrically located with regard to said head and provided with admission and exhaust passages, a frame the upper part of which is supported by said casing, suitable supports for the lower part of said frame, pivots on said frame, pistons mounted on said pivots reciprocating cylinders surrounding said pistons, said frame carrying said pistons, the said cylinders being free to rotate around said stem, substantially as described.

22. In a rotary engine, the combination of a casing, provided with an inlet-passage, a tool-holder in said casing, a supporting stem or stud provided with a head and a projecting portion eccentrically located with regard to said head and provided with admission and exhaust passages, a frame the upper part of which is supported by said casing, suitable supports for the lower part of said frame, pivots on said frame, pistons mounted on said pivots, reciprocating cylinders surrounding said pistons, said frame carrying said pistons, the said cylinders being free to rotate around said stem, substantially as described.

23. In a rotary engine, a supporting stem or stud provided with a head and a tubular stem carried by said head and eccentrically located with regard thereto, said tubular stem having admission and exhaust passages for the motive fluid, a plurality of independent cylinders adapted to rotate around said stud, a valve-seat common to all of said cylinders and fixed rigidly to one of them and means for starting, stopping and reversing the engine, substantially as described.

24. In a rotary engine, the combination of the casing I, the stem H, the valve F, the valve-seat E, the independent cylinders A free to rotate around said stem, the frame L, L', the pistons K pivoted on said frame, said stem, valve, valve-seat, and cylinder being provided with suitable passages, the tool-holder M and suitable gearing connecting said frame with said tool-holder, substantially as described.

In testimony whereof I affix my signature in presence of two witnesses.

FRANCIS J. HAESELER.

Witnesses:
FRANK D. BLACKISTONE,
JOHN H. HOLT.